July 21, 1936.  G. A. LYON  2,048,401
MULTIPART SHOVE DOWN COVER
Filed Jan. 2, 1932   3 Sheets-Sheet 1
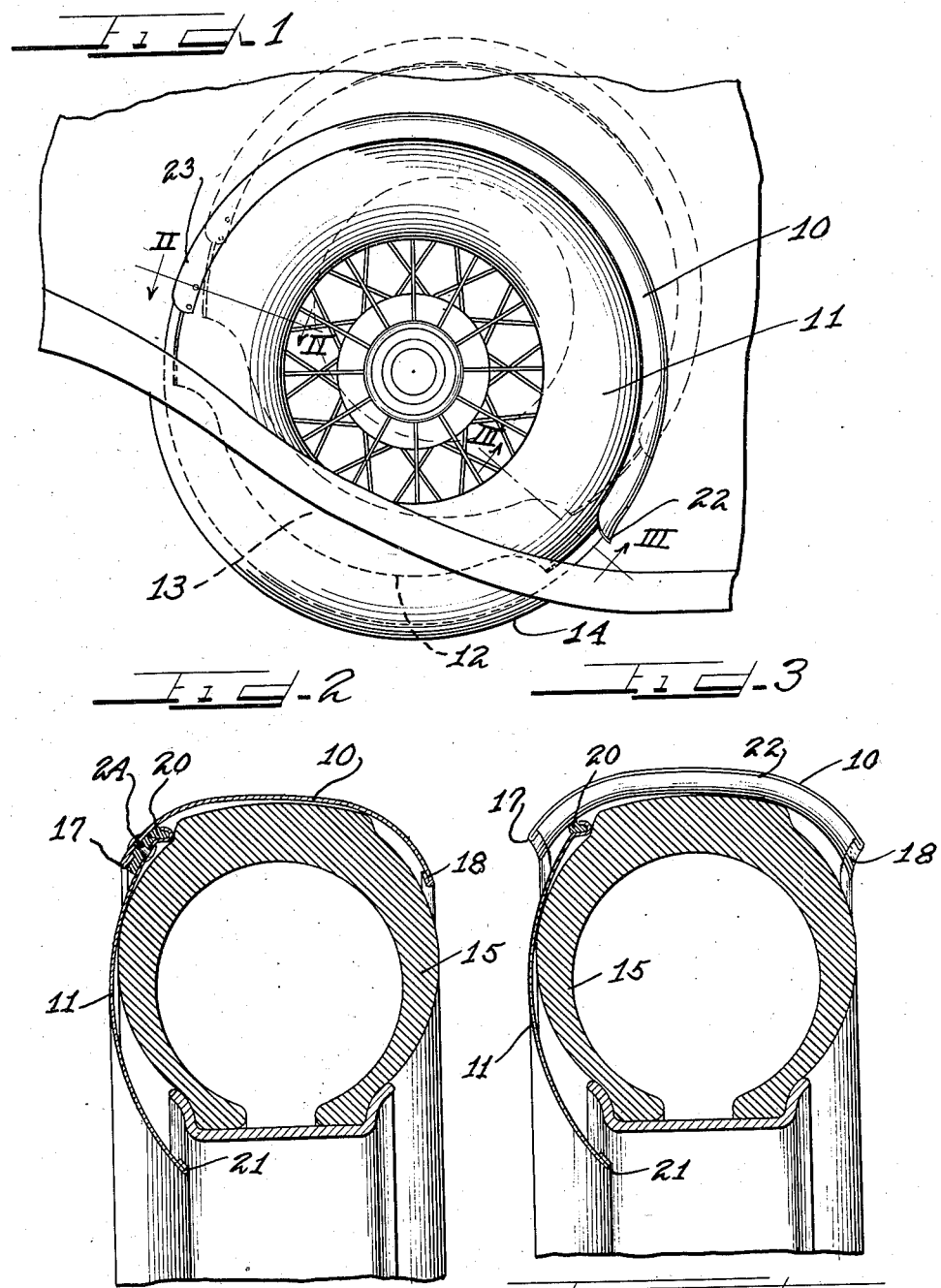

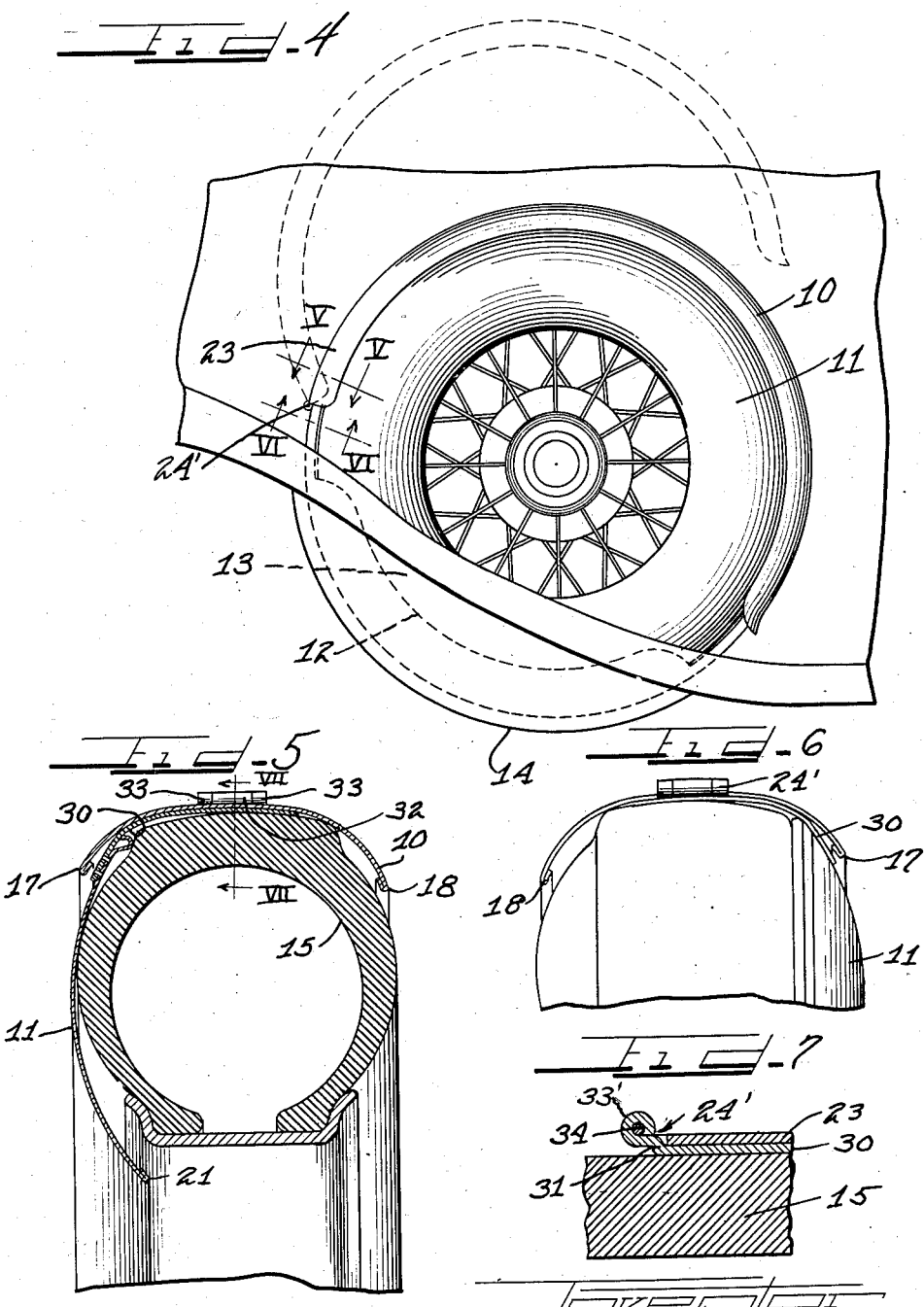

July 21, 1936.   G. A. LYON   2,048,401
MULTIPART SHOVE DOWN COVER
Filed Jan. 2, 1932   3 Sheets-Sheet 3
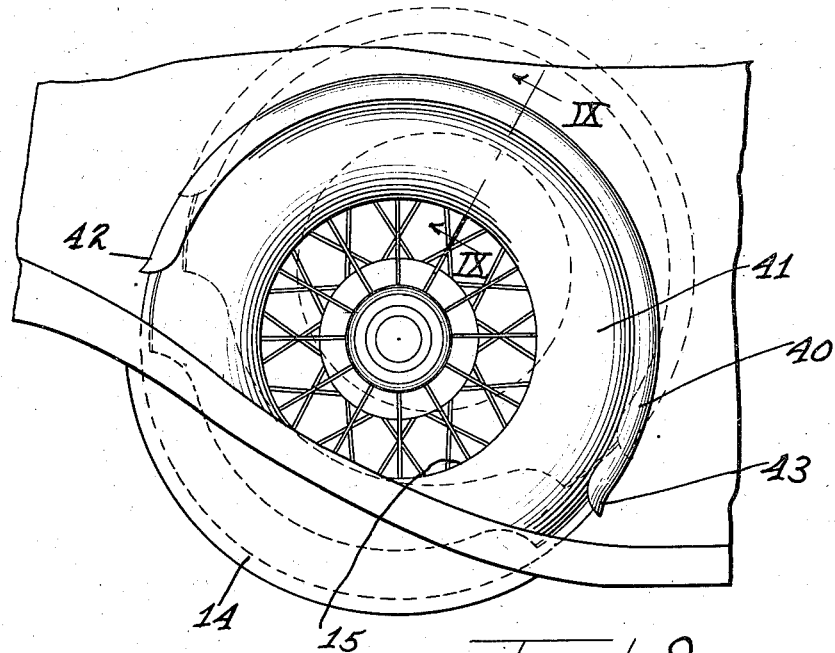
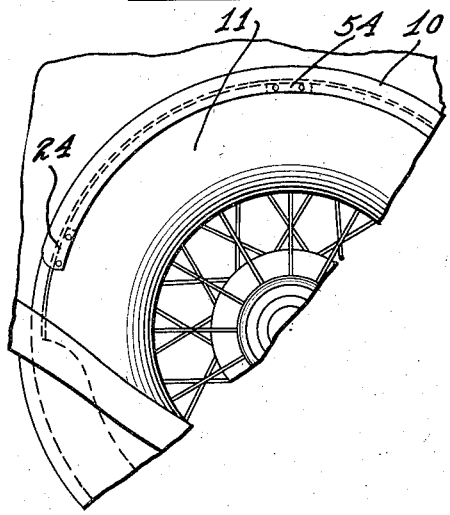
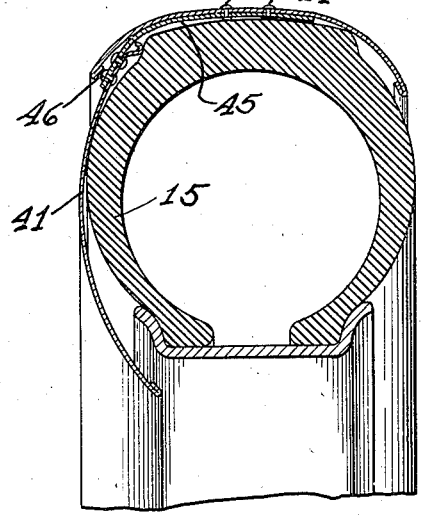
Inventor
George Albert Lyon.
by Charles Hill
Attys Patented July 21, 1936

2,048,401

UNITED STATES PATENT OFFICE 2,048,401

MULTIPART SHOVE DOWN COVER

George Albert Lyon, Allenhurst, N. J., assignor to Lyon Incorporated, Asbury Park, N. J., a corporation of Delaware Application January 2, 1932, Serial No. 584,551

6 Claims. (Cl. 150—54)

This invention relates to a metallic tire cover and more particularly to an improved multi-part tire cover adapted to be shoved downwardly into cooperation with a tire such as the spare tire carried in a fender well of an automobile.

The object of this invention is to provide a multi-part tire cover of the character disclosed in my Letters Patent 1,807,697 issued June 2nd, 1931 and which is so constructed that it may be readily shoved into proper tire protecting position on a spare tire mounted on an automotive vehicle or the like without necessitating the removal of the tire from the vehicle in order to enable the application of the cover thereto.

Another object of the invention is to provide a multi-part tire cover of the character disclosed in my aforesaid Letters Patent with means whereby the parts are secured together so that they may be applied at the same time to the spare tire.

A further object of the invention relates to the provision of means in my multi-part spare tire cover whereby the ring or tread covering member is pivotally or hingedly connected to the side plate of the cover.

A still further object of the invention is to provide an improved and simplified tire cover adapted to be readily shoved downwardly onto a spare tire mounted in a fender well of an automobile and whereby the cover is self-retained on the spare tire.

In accordance with the general features of my invention there is provided several forms of the device each of which includes a side plate part for disposition over the outer side wall of the spare tire and a peripheral or rim part for disposition over the exposed portion of the tread of the spare tire and having a pivotal or hinge connection with a marginal portion of the side plate part.

Another feature of the invention relates to the character of the pivotal connection provided in my novel cover and its location with respect to the parts of the cover.

Other objects and features of this invention will more fully appear from the following detailed description taken in connection with the accompanying drawings which illustrate several embodiments thereof and in which Figure 1 is a fragmentary elevational view illustrating the first form of my invention as being applied to a spare tire mounted in a fender well of an automotive vehicle and in which figure the dotted lines indicated the position of the parts of the cover just prior to their application to the tire.

Figure 2 is a fragmentary enlarged cross sectional view taken on the line II—II of Figure 1 looking in the direction indicated by the arrows.

Figure 3 is a fragmentary enlarged sectional view taken on the line III—III of Figure 1 looking in the direction indicated by the arrows.

Figure 4 is a view similar to Figure 1 illustrating another form of the cover in which the two parts of the cover are connected together by a hinge disposed at one end of the peripheral part and in which figure I have illustrated by the dotted lines a position of the rim part just prior to its application to the tire.

Figure 5 is an enlarged fragmentary sectional view taken on the line V—V of Figure 4 looking downwardly.

Figure 6 is an enlarged fragmentary end view of the hinge construction shown in Figure 4.

Figure 7 is a fragmentary sectional view taken on the line VII—VII of Figure 5 looking in the direction of the arrows and illustrating the construction and arrangement of the hinge.

Figure 8 is another elevational view similar to Figure 1 illustrating a third form of the invention in which the rim or peripheral member is pivotally connected at a central portion thereof to the marginal portion of the side plate and in which figure I have illustrated by dotted lines the position of the rim and side plate just prior to the application of the cover to the tire.

Figure 9 is an enlarged cross sectional view taken on the line IX—IX of Figure 8 looking in the direction indicated by the arrows, and Figure 10 is a fragmentary view of a portion of the tire cover applied to a tire which constitutes a modification of the form of the invention shown in Figure 1 to the extent that the rim is connected to the side plate at two points instead of at one.

In the form of the invention shown in Figures 1, 2, and 3 the cover comprises like my patented cover two parts namely a split rim 10 and an arcuate side plate 11 both parts of which are of convex cross section. The side plate 11 while of a ring-like contour does not comprise a complete circle but is cut off as indicated at 12 in such a manner as to provide it with a downwardly extending central piece 13 adapted to project into the fender well 14 when the tire cover is in proper tire protecting position on the spare tire 15 disposed in the fender well 14. The tire and fender well are of conventional construction and do not per se constitute part of the present invention.

The split rim 10 like my patented split rim is adapted to hold the side plate in proper tire protecting position on the tire 15. It however is different from my patented construction in that it may be removed from the spare tire without necessitating removal of the tire from the fender well. This is accomplished by making it of a shorter circumferential length than my patented rim so that it does not extend down into the fender well.

Furthermore it will be noted that both edges of the split rim 10 are turned back upon themselves as indicated at 17 and 18 and that the turned edge 18 extends inwardly of the outermost periphery of the tire so as to aid in preventing lateral displacement of the rim and cover relative to the tire.

The side plate 11 is of such curvature as to enable it to be disposed over the exposed portion of the outer side wall of the spare tire as shown in Figure 2. Its outermost marginal edge is provided with a rubber cushioning strip 20 for engagement with the inner surface of the split rim and its innermost peripheral edge is turned back upon itself as indicated at 21.

The split rim 10 has one end flared as indicated at 22 so as to enable this end to be readily shoved downwardly onto the spare tire from the dotted position to the full line position as shown in Figure 1. The other end 23 of the split rim 10 is secured at 24 (Figure 2) to the side plate adjacent its cushioning means 20. It is about this point or place 24 that the split rim is adapted to be pivoted to and from the dotted line position shown in Figure 1. It will of course be appreciated that the split rim is made of a yieldable material other than fabric such for example as metallic sheet so that it will have the requisite flexibility to enable it to be snapped into proper tire protecting position. Furthermore it like my patented tire cover may have such a degree of resiliency as to enable it to tend at all times to contract to a diameter less than the outermost diameter of the tire so that it will retain itself as well as the side plate in proper tire protecting position on the spare tire.

This cover of my invention may be readily applied to the spare tire by shoving it downwardly onto the spare tire in the fender well and by flexing the split rim into the dotted line position and about the fixed point 24. Once the side plate 11 is in proper tire protecting position on the outer side wall of the spare tire the split rim may be shoved downwardly from the dotted line position to the full line position. It is during this movement of the split rim that its flared end 22 aids in its movement onto the spare tire.

In Figures 4, 5, 6, and 7 I have illustrated a modification of the form of cover shown in Figures 1, 2, and 3 in which the same reference characters have been employed to designate parts corresponding to the same parts of the first form of the invention. This second form of the invention merely differs from the first form of the invention in the type of connection employed between the split rim 10 and the side plate 11. Instead of using a fixed riveted connection such as the connection 24 I employ in this modification a regular hinge construction designated generally by the reference character 24'. This hinge 24' is of a conventional form and is secured between the end 23 of the split rim and an extension 30 (Figures 5 and 6) secured to the outermost marginal edge of the side plate 11. This extension 30 may be made of any suitable material such for example as metallic sheet and is suitably riveted to the outer marginal portion of the side plate 11. The central part 31 of the hinge 24' is secured to this extension 30 and as a matter of fact is shown as being made integral with the extension 30 (Figure 7). That is to say the extension 30 has formed integral with it the hinge portion 31 which underlies the end 23 of the rim and extends outwardly and laterally therefrom and terminating in the integral eye portion 32. This eye portion is disposed between two similar eye portions 33 formed integral with the extreme edge of the end 23 of the rim 10. A pivot or hinge pin 33' extends through the three eye portions so as to complete the hinge.

The operation of this modified form of the invention being substantially the same as the form described in connection with Figures 1, 2, and 3 it is thought that no further description of the same is required.

In Figures 8 and 9 I have illustrated a still further modification of the invention in which the split rim instead of being connected at one of its ends to the side plate is connected at its mid section to the side plate. The split rim of this form of the invention is designated by the reference character 40 and the side plate is designated by the reference character 41. These two parts are designed to form a cover for a spare wheel 15 disposed in a conventional automobile fender well 14. Inasmuch as these two parts 40 and 41 are of substantially the same general cross section and shape as the parts 10 and 11 it is thought that no further detail description of the shape or cross sectional construction of these parts is necessary. It will be noted that both ends of the split rim 40 are flared as indicated at 42 and 43 so as to enable the cover to be shoved downwardly with facility onto the spare tire disposed in the fender well without necessitating removal of the spare tire from the well. The split rim intermediate its ends is fixedly secured by rivets 44 to a lateral extension 45 secured to the outer marginal edge of the side plate 41 by means of rivets or bolts 46. This extension projects laterally from the side plate under the split rim and over the tread of the tire. It will be noted that the extension 45 due to the fact that it must closely hug the tire between the split rim and the tire tread is made of substantially the same cross section as the corresponding adjacent portion of the split rim (Figure 9).

Now it will be evident that when the cover shown in this modification is shoved downwardly on the tire from the dotted line position to the full line position the ends 42 and 43 of the split rim will flex outwardly thus permitting the cover to be moved downwardly with facility onto the spare tire. It will of course be appreciated that the split rim may also be made of suitable sheet material such for example as metallic sheet and may be provided with a resiliency of such character as to at all times tend to cause the ends of the rim to contract to a diameter less than the normal diameter of the tire. This feature is advantageous inasmuch as it enables the split rim to not only retain itself in position on the tire but to also retain the side plate in proper tire protecting position on the spare tire.

In Figure 10 I have illustrated a slight modification of the tire cover shown in Figure 1 which only differs from the construction shown in Figtire 1 in that the split rim 10 is connected to the side plate 11 at two points namely points 24 and 54 instead of at one point. In other words the split rim 10 is secured by rivets at two points namely points 24 and 54 to the outer marginal edge of the side plate 11. This construction will be found to be advantageous where it is desired to increase the rigidity of the cover with respect to its side plate.

Now I desire it understood that although I have illustrated and described in detail the several embodiments of this invention the invention is not to be thus limited but only insofar as defined by the scope and spirit of the appended claims.

I claim as my invention:

1. A tire cover for spare tires comprising a side part to substantially cover the exposed portion of the outer side wall of a spare tire and a tread covering part extending from said side part across the tread of the tire and provided with expansible and contractible means whereby the inner circumferential side of the tread part may be brought into holding engagement with the tire, said two parts being secured together in such a manner as to permit pivotal movement of the rim part with reference to the side part in applying the cover to and removing it from the tire.

2. A tire cover for spare tires comprising a side part to substantially cover the exposed portion of the outer side wall of a spare tire and a tread covering part extending from said side part across the tread of the tire and provided with expansible and contractible means whereby the inner circumferential side of the tread part may be brought into holding engagement with the tire, said two parts being secured together in such a manner as to permit pivotal movement of the rim part with reference to the side part in applying the cover to and removing it from the tire, said connection including a hinge disposed between the two parts.

3. A tire cover for spare tires comprising a side part to substantially cover the exposed portion of the outer side wall of a spare tire and a tread covering part extending from said side part across the tread of the tire and provided with expansible and contractible means whereby the inner circumferential side of the tread part may be brought into holding engagement with the tire, said two parts being secured together in such a manner as to permit pivotal movement of the rim part with reference to the side part in applying the cover to and removing it from the tire, said connection including means disposed substantially centrally of and between the ends of the tread covering part for securing the central portion of the tread covering part to the outer edge of the side part.

4. The combination with a fenderwell having a spare tire therein of a tire cover of material sufficiently stiff to prevent collapsing of the tire and formed to extend circumferentially about the exposed outer periphery of the tire and of such shape as to permit it to be shoved downwardly into cooperation with the fenderwell and into a snug fit with the tire in the well, said cover including a side part for disposition over the side of the tire and a peripheral or tread-covering part extending laterally from said side part and being connected to said side part in such a way as to be pivotally movable relative to the side part so as to enable application of the cover to the spare tire.

5. The combination with a fenderwell having a spare tire therein of a tire cover of material sufficiently stiff to prevent collapsing of the tire and formed to extend circumferentially about the exposed outer periphery of the tire and of such shape as to permit it to be shoved downwardly into cooperation with the fenderwell and into a snug fit with the tire in the well, said cover including a side part for disposition over the side of the tire and a peripheral or tread-covering part extending laterally from said side part and being connected to said side part in such a way as to be pivotally movable relative to the side part so as to enable application of the cover to the spare tire, said two parts being secured together for relative pivotal movement at an outer marginal portion of the side part.

6. In combination with a fenderwell having a spare tire therein of a tire cover of material sufficiently stiff to prevent collapsing of the cover and formed to extend circumferentially about the exposed outer periphery of the tire and of such shape as to permit it to be shoved downwardly into cooperation with the fenderwell and into a snug fit with the tire, said cover including a side portion for disposition over the outer side wall of the spare tire and a peripheral portion having its rear edge formed to extend inwardly from the outermost periphery of the tire to an extent sufficient to enable said edge to hold the tire cover against lateral or transverse displacement from the tire, said side portion having a part formed to telescope the well when the cover is mounted on the tire and being connected at a marginal portion thereof to a part of the peripheral portion by a pivotal connection whereby the peripheral portion may be pivoted about said connection to enable the application of the cover to the spare tire.

GEORGE ALBERT LYON.